L. BLUMENTHAL.
COMBINATION MIRROR AND PICTURE FRAME.
APPLICATION FILED DEC. 9, 1912.
1,058,348.
Patented Apr. 8, 1913.
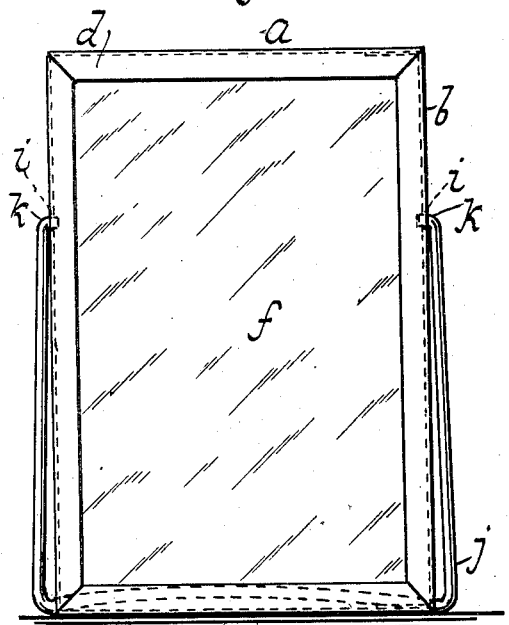
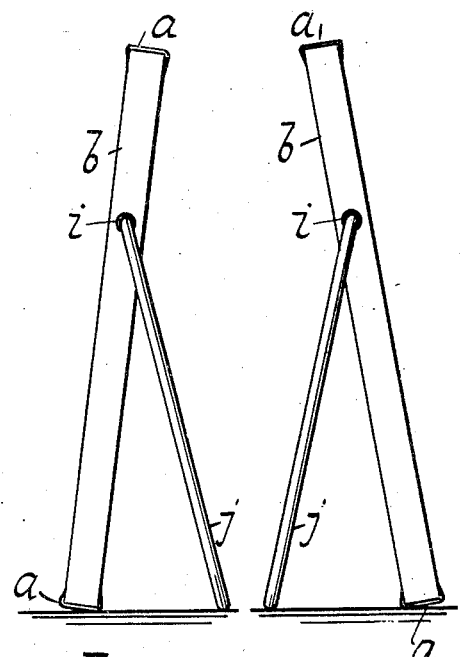
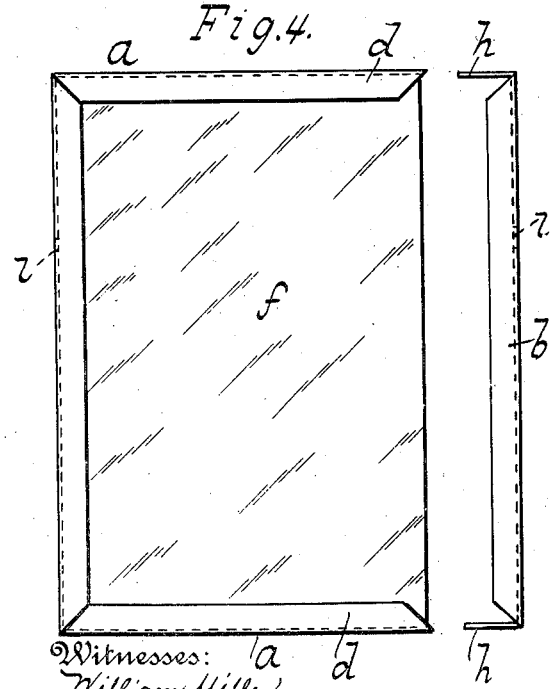
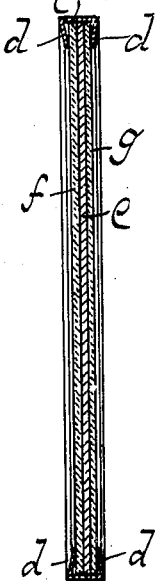
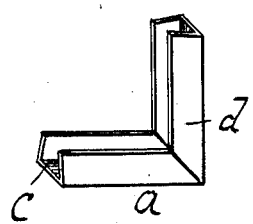
Inventor
Louis Blumenthal

UNITED STATES PATENT OFFICE.

LOUIS BLUMENTHAL, OF BROOKLYN, NEW YORK.

COMBINATION MIRROR AND PICTURE FRAME.

1,058,348. Specification of Letters Patent. Patented Apr. 8, 1913.

Application filed December 9, 1912. Serial No. 735,672.

*To all whom it may concern:*

Be it known that I, LOUIS BLUMENTHAL, a citizen of the United States, residing at Brooklyn, county of Kings, State of New York, have invented new and useful Improvements in Combination Mirror and Picture Frames, of which the following is a specification.

This invention relates to a combination portable metal frame one side of which represents a picture, while the other side is provided with a mirror. One of the side pieces of the frame is adapted to be removed so that the picture or mirror can be removed and a different picture or mirror be inserted. The frame is provided with a bail whereby the frame is supported and positioned at a suitable incline to exhibit the picture or the mirror. The bail has hook members for pivotal connection to the sides of the frame, and the bail is springy so that when the bail is in place it will securely clamp the removable side piece in place. The top, bottom and one of the side pieces consist of a single strip of sheet metal which is shaped to form a channel of suitable configuration to receive the picture and a mirror. The bail or support can be swung over the top of the frame in order to reverse the position of the frame and thereby exhibit the picture when the mirror is not utilized.

Further details of the invention are more fully described in the following specification and claims and illustrated in the accompanying drawings in which:

Figure 1 represents a front elevation of a frame embodying this invention. Fig. 2 is an end view of the same. Fig. 3 is a similar view showing the frame reversed. Fig 4 is a front elevation showing the bail and the side piece removed. Fig. 5 is a vertical section of the same. Fig. 6 is a perspective view of a portion of the frame.

In this drawing the letter $a$ designates a frame which consists of a top, bottom and side piece. This frame is provided with a movable piece $b$ forming one side of the frame. The frame $a$ consists of a single strip of thin sheet metal and it is U shaped to form a channel $c$ with side wings $d$, as indicated in Figs. 5 and 6. The side wings of the frame are suitably angled to fit properly at the bent corners of the frame. The channel with its side wings serves to receive a picture $e$ and a mirror $f$. A sheet of glass $g$ can be located in front of the picture. The picture and mirror are placed with their backs together so that the mirror will face one side of the frame and the picture the other side. The movable side piece is U shaped to correspond to the shape of the frame $a$, and it is provided with top and bottom lugs $h$ to engage the end of the frame $a$ and thus clasp the side in place. The movable side piece and the opposite side of the frame have holes $i$ located in the edges of the side.

A bail or support $j$ having hooked ends $k$ is adapted for insertion into the holes $i$ formed in the frame. The holes in combination with the hooks of the bail constitute a pivotal connection for swingingly mounting the bail to the frame. This bail is U shaped and it comprises a support and at the same time serves as a positioning device for the frame. This bail or support consists of a single piece of spring wire and the upper hooked ends thereof have a tendency to spring toward each other. When the bail is snapped into the holes the upper portion of the bail clamps the movable side piece into place and prevents lateral displacement of the same. When it is desired to reverse the frame the bail is swung over the top of the frame thus showing the picture or the mirror in front.

The side wings of the frame are bent inwardly so as to stiffen the frame, and when the movable side piece is in place the frame is practically dust proof.

I claim:—

1. An article of the kind described, comprising a channeled frame, one of the sides of which is movable, a bail pivotally connected to the sides of the frame, said bail constituting the support for the frame and being adapted to clamp the movable side of the frame.

2. An article of the kind described, comprising a channeled frame having a top bottom and one side formed of a single strip of metal, the other of the sides being movable, a mirror and a picture positioned in the frame, a springy bail provided with hook members for swingingly and removably connecting the bail to the sides of the frame, said bail constituting the support for positioning the frame and being adapted to securely clamp the movable side of the frame.

In testimony whereof I have hereunto set my hand in the presence of two subscribing witnesses.

LOUIS BLUMENTHAL.

Witnesses:
HAZEL V. McELROY,
CHRIS. H. ALMSTAEDT.